United States Patent [19]

Pepper

[11] Patent Number: 5,461,609
[45] Date of Patent: Oct. 24, 1995

[54] PACKET DATA NETWORK SWITCH HAVING INTERNAL FAULT DETECTION AND CORRECTION

[75] Inventor: Andrew T. Pepper, Ingatestone, United Kingdom

[73] Assignee: General DataComm Advanced Research Centre Ltd., United Kingdom

[21] Appl. No.: 317,336

[22] Filed: Oct. 4, 1994

[30] Foreign Application Priority Data

Oct. 13, 1993 [GB] United Kingdom ............... 9321165

[51] Int. Cl.⁶ ..................... H04L 12/26; H04L 12/56
[52] U.S. Cl. ............... 370/16; 370/60.1; 340/827; 395/182.02; 395/312; 395/200.01
[58] Field of Search ............... 370/13, 16, 16.1, 370/17, 53, 57, 58.1, 58.2, 60, 60.1, 79, 94.1, 94.2, 94.3; 340/825.01, 825.03, 827, 285.06; 371/7, 8.1, 8.2, 9.1, 11.1, 11.2, 11.3, 15.1

[56] References Cited

U.S. PATENT DOCUMENTS

| | | | |
|---|---|---|---|
| 4,412,323 | 10/1983 | Abbott et al. ............... | 370/16 |
| 4,561,090 | 12/1985 | Turner ............... | 370/13 |
| 5,138,615 | 8/1992 | Lamport et al. ............... | 370/60 |

*Primary Examiner*—Hassan Kizou
*Attorney, Agent, or Firm*—David P. Gordon

[57] ABSTRACT

A data network switch for switching data between a plurality of data links is disclosed and includes a programmable controller which adapts the data switching in accordance with the state of the switch and the state of the data links. The programmable controller has detection apparatus which detects a problem in the operation of the switch, a memory which stores information on possible problems, their causes, and possible solutions, and a controller. The controller determines from the information stored in the memory the possible causes of the problem according to the nature of the problem detected and determines from the possible causes a ranked series of possible solutions. In addition, the controller carries out the first of the possible solutions, checks the output of the detection apparatus after a predetermined period of time, and if the problem is still present, carries out the next of the possible solutions, and repeats the checking and carrying out of the next of possible solutions until the problem is no longer present or no further possible solutions remain.

8 Claims, 1 Drawing Sheet

PACKET DATA NETWORK SWITCH HAVING INTERNAL FAULT DETECTION AND CORRECTION

FIELD OF THE INVENTION

This invention relates to a data network switch, for example a network switch for use in a packet data network operating to the X.25 protocol, or an asynchronous transfer mode (ATM) switch.

BACKGROUND TO THE INVENTION

Essential features of the operation of such switches are high reliability and tolerance of faults. Providing redundant hardware is only a part of fault tolerance. It is also necessary to determine the nature of any problem that occurs with the main hardware and to make the best use of the redundant hardware in the circumstances.

Published UK patent application No 2271041 discloses a switch in which a control means monitors the operation of the switch and adapts the switching in accordance with a stored list of instructions upon detection of a predetermined condition. This may be, for example, time or data traffic conditions or a fault in one of the data links.

As an example, where the switch contains a main communications controller and a spare controller, the switch may be programmed to use the spare controller if the main controller fails. However, there are several possible disadvantages with this. For example, it may be that the controller is not itself faulty, but the link to it has failed. There is also no provision for dealing with the problem of the spare controller also failing. If the main controller (or its link) recovers, should communications be returned to it from the spare. Should the Network Management System be notified of the switch-over from one controller or link to the other. The answers to these questions will depend on the situation. For example, if the spare controller uses an expensive "pay on usage" public data circuit to provide a back-up for the main "leased line", it will be desirable to return to the main line as soon as possible. But if the service carried is such as to demand high reliability, for example video coverage for remote surgery, it will be necessary to delay switching back to the main line until there is no risk of further disruption to the service.

The present invention provides a network switch which can be configured to provide heuristic solutions to management problems within the network components.

SUMMARY OF THE INVENTION

According to the invention there is provided a data network switch for switching data between a plurality of data links, the switch comprising a programmable controller for adapting the data switching in accordance with the state of the switch and the data links therewith, the controller comprising detector means for detecting a problem in the operation of the switch, memory means storing information on possible problems, their causes and possible solutions, and control means for:

(a) determining from the information stored in the memory means possible causes of the problem according to the nature of the problem detected, and for determining from the possible causes a ranked series of possible solutions;

(b) carrying out the first of the possible solutions;

(c) checking the output of the detector means after a predetermined period of time, and, if the problem is still present, carrying out the next of the possible solutions; and (d) repeating step (c) until the problem is no longer present or no further possible solutions are left.

Examples of problems which may be experienced with a data network switch are:

the physical failure of an external link;

an external link becoming noisy or unreliable because of a faulty connection, for example;

hardware failures within the switch, for example the slot controller, the connections thereto, or the switch fabric;

software failures.

Preferably, the programmable controller is also arranged to adapt the data switching in accordance with fulfilment of any one of a plurality of predetermined conditions. The programmable controller preferably comprises a stored program defining the conditions and arranged to monitor continuously or repeatedly fulfilment of the conditions.

The switch may be an X.25 switch of the general type disclosed in published UK patent application 2271041, an ATM switch of the general type disclosed in published UK patent application 2273224, or a data network switch operating under another protocol.

DETAILED DESCRIPTION OF THE ILLUSTRATED EMBODIMENTS

Figure 1:
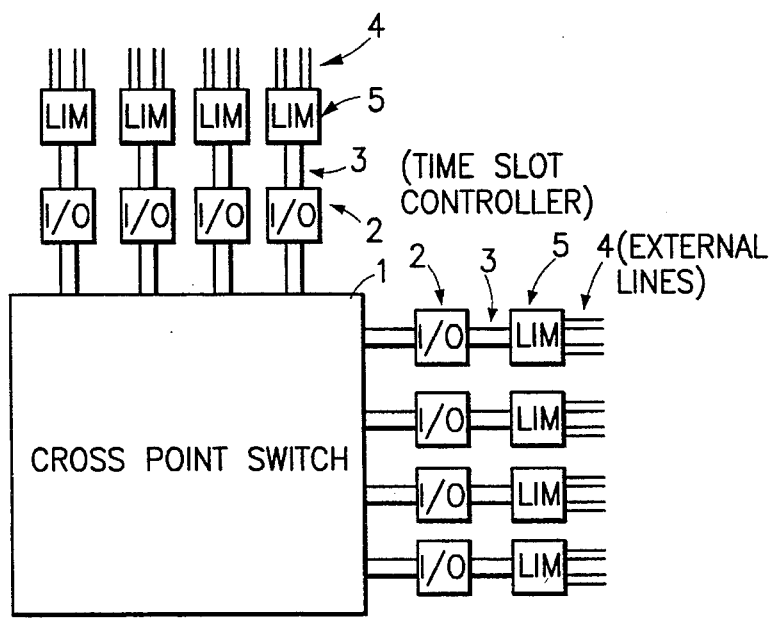
FIG. 1 is a block diagram of a conventional ATM switch.

In a typical data network switch, as illustrated by FIG. 1, the switch fabric 1 consists of a cross-point switch having eight inputs and eight outputs, for example. It will be appreciated that a greater or smaller number of connections is possible. Each input/output pair 2 from the cross-point switch 1 is connected to a link controller card 3, referred to as a slot controller, controlling two or four external lines 4 via a line interface module (LIM) 5. In addition to the active slot controllers 3, there is a "slot 0" controller whose function is to monitor the status of the other controllers by sending out "health check cells" to the other slot controllers at regular intervals. The controllers respond to these cells, if working correctly; the absence of a response indicates a problem with the slot.

Information by which the operation of the switch is controlled is stored in a Managed Information Base (MIB), into which data relating to the status of individual switch components is written and from which configuration data for the components is read. Thus, each of the functional components of the switch communicates with the MIB.

Figure 2:
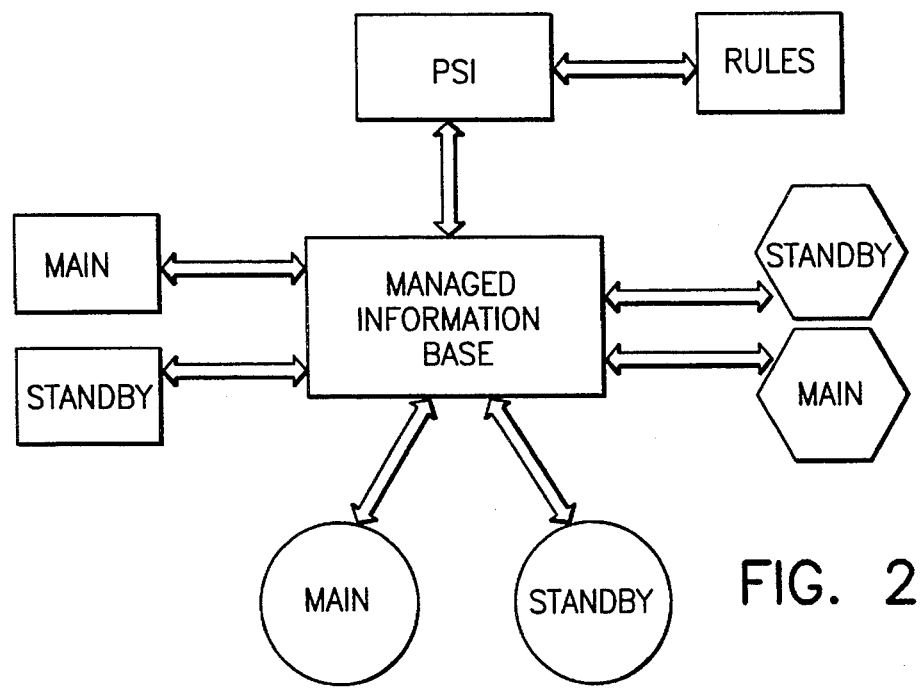
FIG. 2 is a block diagram showing the main control functions of the switch in accordance with an exemplary embodiment of the invention.

In the switch of the present invention, illustrated in FIG. 2, a controller separate from the switch controller, the Problem Solving Intelligence or PSI, monitors the state of the MIB and reacts to the detection of a problem by determining from its own Rules data store the likely causes of the problem and the possible solutions. Each of the functional components of the switch, for example main and standby links, looks to information in the MIB to determine its correct operating state. Thus, if the information stored in the MIB indicates that the link should be active instead of inactive, the link is brought into use.

Figure 3:
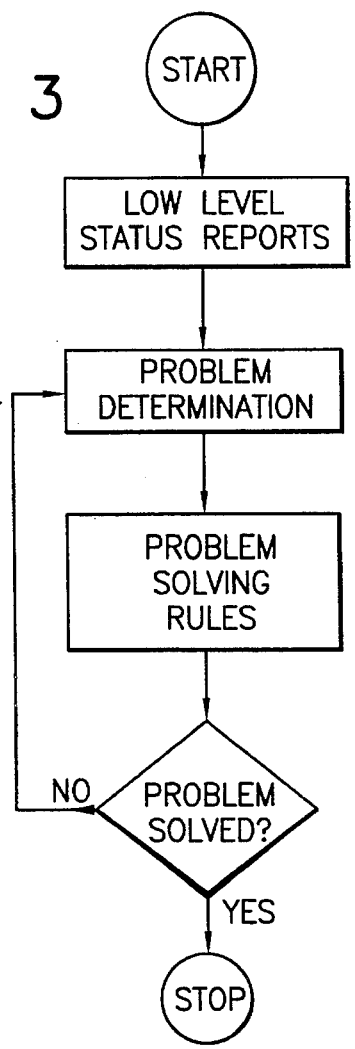
FIG. 3 is a flow diagram showing the process of problem solving undertaken by the switch of the invention.

The PSI constantly monitors the information stored in the MIB to detect whether a problem has arisen, for example that a particular slot controller has not responded to the health check cells sent to it by the slot 0 controller. If it detects such a problem, it refers to the rules stored in the Rules data store to determine likely causes, for example that the slot controller has failed, the connections to it have failed, the LIM has failed, the switch fabric itself has failed or perhaps that the interface to slot 0 has itself failed. These likely causes are then used to determine appropriate possible solutions, for example switch to another link or another controller, again using the stored rules, the solutions being ranked according to which is most likely to succeed having regard to the possible causes identified. The PSI then writes to the MIB to try the solutions, in turn, at the same time initiating a monitoring process which watches the information written into the MIB to see whether the action taken has been effective. If one trial solution does not return the switch to its desired operational state within a predetermined period of time, the PSI writes data to the MIB which will bring about the next most likely of the possible solutions. The process is repeated until the problem is solved, or all the possible solutions have been attempted, when a warning to the operator can be generated. The process is illustrated by the flowsheet of FIG. 3.

The PSI comprises a script-based language in which certain statements are particularly adapted to the monitoring and problem seeking functions. For example: every

```
every
Syntax: every(condition)
{
    statement block
}
```

The every statement sets up the conditions for the statement block to be executed. Unlike a conventional if statement, each every statement generates a small task that watches for its particular event to occur. For example, the following program:

```
name main
timercell onesec
onesec=1
every (onesec=0)
{
onesec=10
cursor 1,60
print dv2system.currentTime
refresh
}
wait
``` sets up the every so that every time onesec reaches 0 the code inside the curly brackets is executed. The wait statement pauses the procedure, waiting for an event to occur. Multiple every statements can be placed in a procedure and the PSI interpreter will look for any of the conditions to be true to execute the corresponding statement block.

```
spawn
```

The spawn statement runs the procedure procedure name from the file filename as a background task simultaneously with the original task.

```
try
Syntax: try action,test,period
```

The try statement spawns two tasks, one with the name action, the other with the name test. Both spawned tasks are run in the background. When executing try statements, PSI will monitor the way both the action and test procedures stop. If abort is used to stop the action procedure, then PSI will recall the test procedure. If stop is used to stop the test procedure, then PSI assumes that the problem is now resolved, and the rest of the current statement block is skipped until the next close curly bracket is met.

If stop is used to stop the action procedure, then PSI will wait for timeout seconds for test to return "successful", i.e. to terminate using a stop.

wait

The wait statement suspends the currently running procedure. This is generally used after a number of every or when statements have been executed to wait for the specified events to occur.

stop

This statement performs a clean stop of a procedure. Any resource allocated to the procedure is shut down. If the procedure was generated as the test procedure in a try statement, then the original procedure skips the rest of the block. For example, in the program:

```
name main
every (.slotsdown)
{
try swapslot,testslot
try swapxp,testxp
}
stop
``` the first try statement runs the procedure testslot to test to see if the slot has come back into operation. If the testslot procedure uses a stop statement to terminate, then PSI will skip to the end of the code block.

I claim:

1. A data network switch for switching data between a plurality of data links, the switch comprising a programmable controller for adapting the data switching in accordance with the state of the switch and the data links therewith, the controller comprising detector means for detecting a problem in the operation of the switch, memory means storing information on possible problems, their causes and possible solutions, and control means for:

(a) determining from the information stored in the memory means possible causes of the problem according to the nature of the problem detected, and for determining from the possible causes a ranked series of possible solutions;

(b) carrying out the first of the possible solutions;

(c) checking the output of the detector means after a predetermined period of time, and, if the problem is still present, carrying out the next of the possible solutions; and (d) repeating step (c) until the problem is no longer present or no further possible solutions are left.

2. A data network switch according to claim 1, wherein the programmable controller is also arranged to adapt the data switching in accordance with fulfilment of any one of a plurality of predetermined conditions.

3. A data network switch according to claim 2, wherein the programmable controller comprises a stored program defining the conditions and arranged to monitor continuously or repeatedly fulfilment of the conditions.

4. A data network switch according to claim 2, wherein at least one of the conditions is a time of day.

5. A data network switch according to claim 1, arranged to switch data in packet form.

6. A data network switch according to claim 1, wherein the control means is arranged to output an operator warning signal when no further possible solutions are left in step (d).

7. A data network switch according to claim 1 which is an ATM cell switch.

8. A data network switch according to claim 1, comprising a Managed Information Base (MIB) receiving and storing information relating to the operation of all the functional components of the switch, wherein the detector means is arranged to monitor the information in the MIB to detect problems in the operation of the switch.

* * * * *